United States Patent [19]

Iwata et al.

[11] Patent Number: 6,104,160
[45] Date of Patent: Aug. 15, 2000

[54] HOUSEHOLD POWER SUPPLY SYSTEM USING ELECTRIC VEHICLE

[75] Inventors: Kazurou Iwata; Hideaki Horie; Masaaki Taniguchi; Junichi Kasai; Masahiko Teramoto; Hirokazu Hirano, all of Kanagawa-ken, Japan

[73] Assignee: Nissan Motor Co., Ltd., Kanagawa-ken, Japan

[21] Appl. No.: 09/208,481

[22] Filed: Dec. 10, 1998

[30] Foreign Application Priority Data

Dec. 10, 1997 [JP] Japan .................................. 9-356317

[51] Int. Cl.[7] .................................................. H01M 10/46
[52] U.S. Cl. ............................ 320/103; 320/108; 307/66
[58] Field of Search ..................................... 320/103, 104, 320/105, 108, 111; 307/44, 46, 48, 64, 66

[56] References Cited

U.S. PATENT DOCUMENTS

| | | | |
|---|---|---|---|
| 5,157,319 | 10/1992 | Klontz et al. ........................... | 320/108 |
| 5,323,099 | 6/1994 | Bruni et al. ............................ | 320/108 |
| 5,461,299 | 10/1995 | Bruni ..................................... | 320/108 |
| 5,568,036 | 10/1996 | Hulsey et al. ......................... | 320/108 |

FOREIGN PATENT DOCUMENTS 5-95639   4/1993   Japan .

*Primary Examiner*—Edward H. Tso
*Attorney, Agent, or Firm*—McDermott, Will & Emery

[57] ABSTRACT

A household power supply system using an electric vehicle, comprises an external power system, a house with an indoor power line, an electric vehicle having a vehicle power system with vehicle batteries, a charger/discharger for connecting separately the indoor power line and the vehicle power system, and a controler for controlling power supply to the indoor power line. The power supply system is capable of supplying energy from the household power supply to the vehicle batteries at the normal state, and conversely supplying energy from the vehicle batteries to the indoor power line at the time of emergency, etc. to enable employment of indoor electric equipments.

17 Claims, 6 Drawing Sheets

| FIG. 3 |
|---|
| FIG.3A \| FIG.3B |

HOUSEHOLD POWER SUPPLY SYSTEM USING ELECTRIC VEHICLE

The contents of Application No. TOKUGANHEI 9-356317, filed on Dec. 10, 1997 in Japan is hereby incorporated by reference.

BACKGROUND OF THE INVENTION

The present invention relates to a household power supply system using an electric vehicle.

In Patent Application Publication (KOKAI) Hei 5-95639, an energy supplying system for supplying energy from a household power supply in a housing to vehicle batteries of the electric vehicle is disclosed. This energy supplying system comprises a discharger connected to a household power supply on the housing side, and a charger provided on the electric vehicle side. As a discharging connector of the discharger is connected to a charging connector of the charger, the household power supply supplies energy to the electric vehicle side.

SUMMARY OF THE INVENTION

However, in the above energy supplying system, the household power supply supplies energy to the electric vehicle side inasmuch as the household power supply is operating normally. Accordingly, a home electric installation cannot be utilized at the time of emergency when power is not supplied from an electric power company at the disaster, etc., for example, so that the household power supply does not supply power to the electric vehicle side.

Therefore, it is an object of the present invention to provide a household power supply system using an electric vehicle, which is capable of supplying energy from the household power supply to the electric vehicle side at the normal state, and conversely supplying energy from the electric vehicle to the house side at the time of emergency, etc. to enable employment of indoor electric equipments.

It is another object of the present invention to provide a power supply system which is capable of achieving a lower cost of power supply by making a power consumption uniform.

In order to achieve the above object, according to the present invention, there is provided a household power supply system using an electric vehicle, comprising:

an external power system;

a house having house-wiring, the external power system supplying power to the house-wiring;

an electric vehicle having a vehicle power system with a vehicle storage battery;

a charger/discharger separable connecting between the house-wiring and the vehicle power system; and a controller controlling power supply to the house-wiring.

According to the above configuration, in case either electric power is in short supply in the home, or electric power supplied to the home from an external power system is stopped/shut off, power can be supplied from the vehicle battery of the electric vehicle to the house side.

DESCRIPTION OF THE PREFERRED EMBODIMENTS

Figure 1:
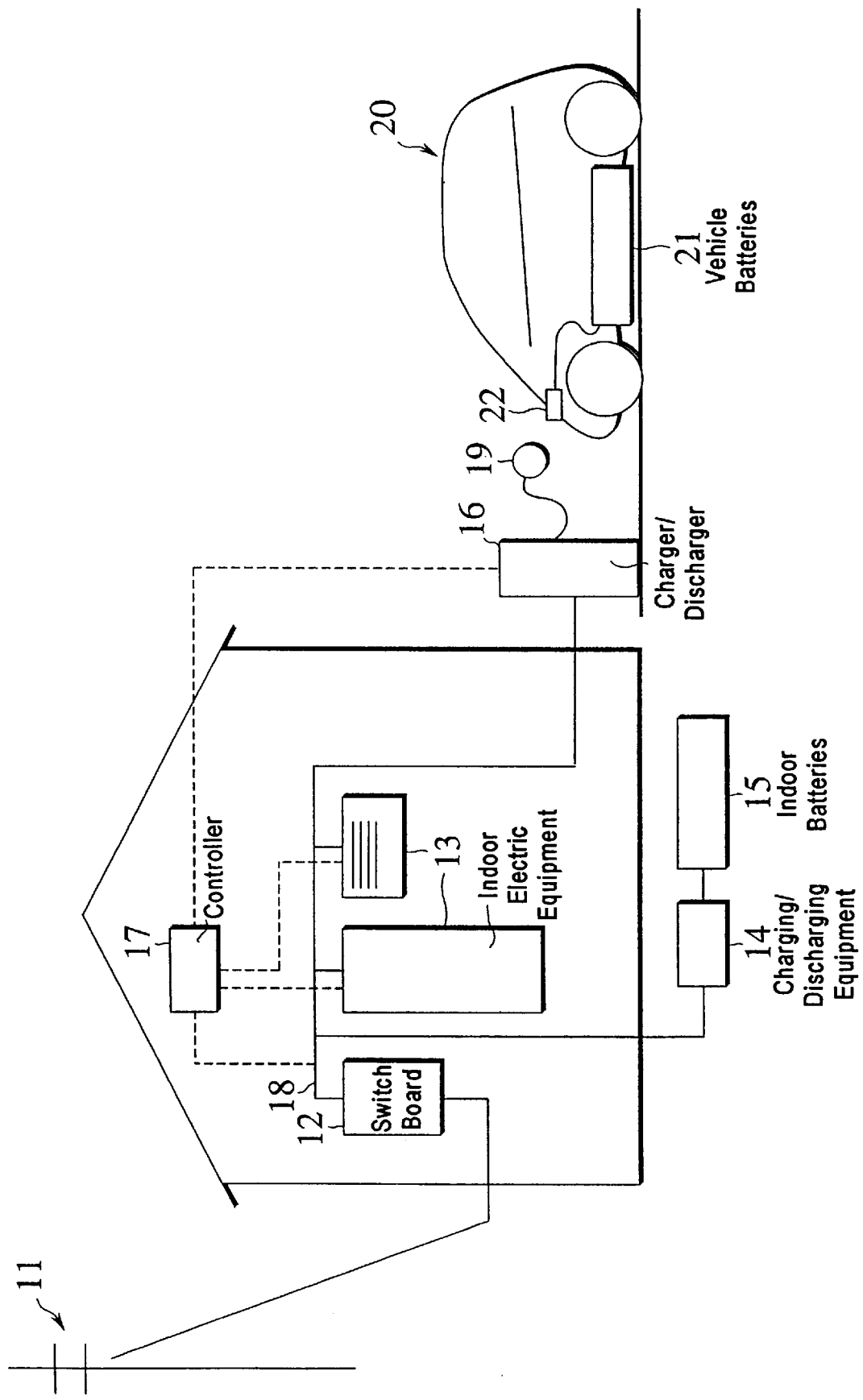
FIG. 1 is a schematic view showing a configuration of a first embodiment.

FIG. 1 is a schematic view showing a configuration of a household power supply system using an electric vehicle according to a first embodiment.

As shown in FIG. 1, the household power supply system has a power line (external power system) 11 through which power is supplied from an electric power company. On the house side, there are provided a switchboard 12 connected to the power line 11, various indoor electric equipments 13 connected to the switchboard 12, a charging/discharging equipment 14 connected to the switchboard 12 to prevent overcharge and overdischarge, indoor batteries (household batteries) 15 connected to the charging/discharging equipment 14, a charger/discharger 16 connected to the switchboard 12, and a controller 17.

As shown in FIG. 1, the controller 17 is connected to indoor power lines (house-wiring) 18 of the switchboard 12, the indoor electric equipments 13, the charging/discharging equipment 14, and the charger/discharger 16. The controller 17 detects whether or not power is being supplied from the power line 11, and detects whether or not supplied power is a midnight power. In addition, the controller 17 detects total storage amount of the indoor batteries 15 and the vehicle batteries 21 described later.

The charger/discharger 16 is installed on the outside of the housing. The charger/discharger 16 has a charging/discharging connector 19, described later, which is connected to the electric vehicle 20.

The electric vehicle 20 includes vehicle batteries 21. An inlet portion 22 is connected to the vehicle batteries 21. As the inlet portion 22 is connected to the charging/discharging connector 19, transmission/reception of power can be effected between the inlet portion 22 and the charging/discharging connector 19.

Next, configurations of the charger/discharger 16 provided on the house side and a vehicle power system 23 on the electric vehicle side connected thereto are explained.

Figure 2:
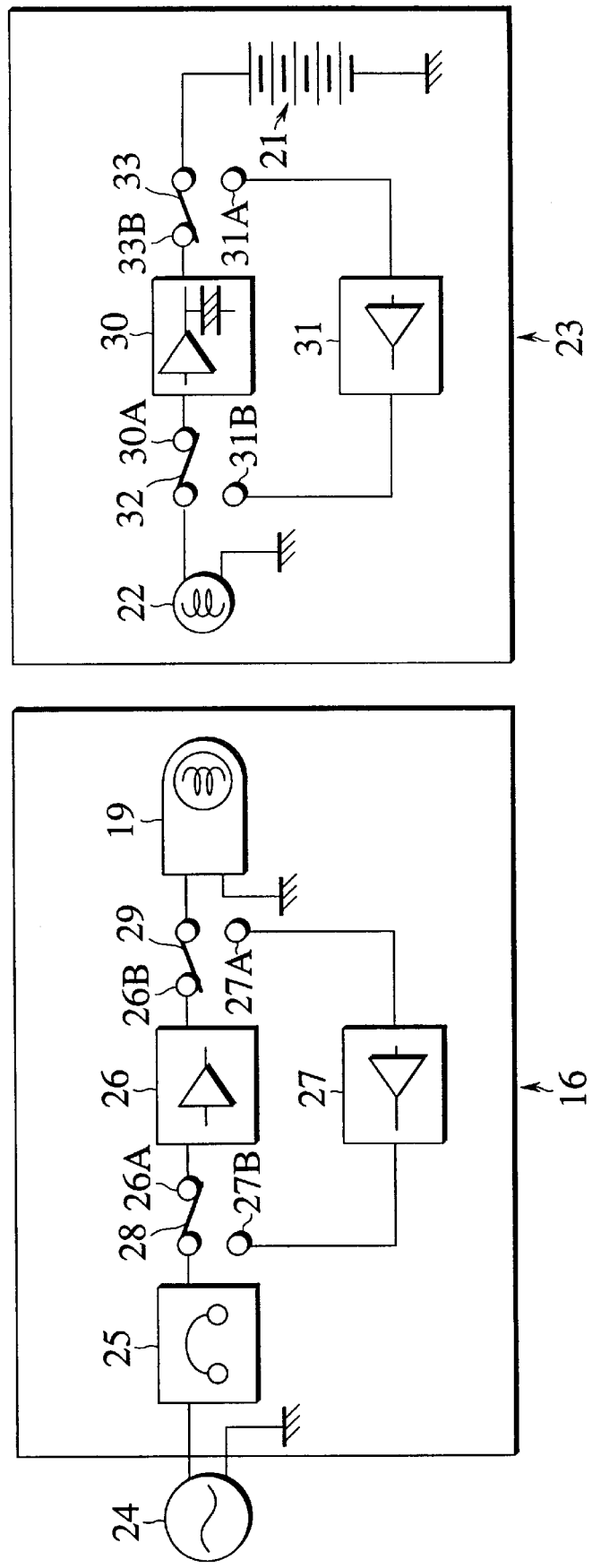
FIG. 2 is a circuit diagram showing configurations of a charger/discharger and a vehicle power system shown in FIG. 1.

As shown in FIG. 2, the charger/discharger 16 includes an input open/close portion 25, a first inverter 26, a second inverter 27, the charging/discharging connector 19, a first selector switch 28, and a second selector switch 29. The input open/close portion 25 is connected to a household power supply 24. The household power supply 24 is connected to the indoor power line 18 shown in FIG. 1. The controller 17 shown in FIG. 1 ON/OFF-controls the input open/close portion 25.

The first selector switch 28 connects any one of an input terminal 26A of the first inverter 26 and an output terminal 27B of the second inverter 27 selectively to the input open/close portion 25.

The second selector switch 29 connects any one of an output terminal 26B of the first inverter 26 and an input terminal 27A of the second inverter 27 selectively to the charging/discharging connector 19.

The charging/discharging connector 19 includes one coil which constitutes a transformer being magnetically coupled with the inlet portion 22 of the electric vehicle 20 to enable power transmission.

The vehicle power system 23 includes the inlet portion 22, a third inverter 30 for effecting AC/DC conversion, a fourth inverter 31 for effecting DC/AC conversion, the vehicle batteries 21, a third selector switch 32, and a fourth selector switch 33. The inlet portion 22 includes the other coil which constitutes the transformer being magnetically coupled with the charging/discharging connector 19 of the charger/discharger 16 to enable power transmission.

The third selector switch 32 connects any one of an input terminal 30A of the third inverter 30 and an output terminal 31B of the fourth inverter 31 selectively to the inlet portion 22.

The fourth selector switch 33 connects any one of an output terminal 30B of the third inverter 30 and an input terminal 31A of the fourth inverter 31 selectively to the vehicle batteries 21.

The controller 17 shown in FIG. 1 switches appropriately respective connection among the selector switches 28, 29, 32, 33. More particularly, the controller 17 turns ON the input open/close portion 25 and also sets both the charger/discharger 16 and the inlet portion 22 selectively into a first state (state shown in FIG. 2) and a second state.

In the first state, the first selector switch 28 and the second selector switch 29 select the first inverter 26, and the third selector switch 32 and the fourth selector switch 33 select the third inverter 30. Hence, an electric current supplied from the household power supply 24 is AC/AC-converted by the first inverter 26, then output to the vehicle power system 30 via magnetic coupling between the charging/discharging connector 19 and the inlet portion 22, then AC/DC-converted by the third inverter 26, and then supplied to the vehicle batteries 21. As a result, the vehicle batteries 21 accumulate electric energy employed in the electric vehicle 20.

In the second state, the first selector switch 28 and the second selector switch 29 select the second inverter 27, and the third selector switch 32 and the fourth selector switch 33 select the fourth inverter 31. Hence, an electric current supplied from the vehicle batteries 21 is DC/AC-converted by the fourth inverter 31, then output to the charger/discharger 16 via the magnetic coupling between the charging/discharging connector 19 and the inlet portion 22, and then AC/AC-converted by the second inverter 27. As a result, an AC current can be supplied to the indoor power line 18 shown in FIG. 1.

Figure 3A:
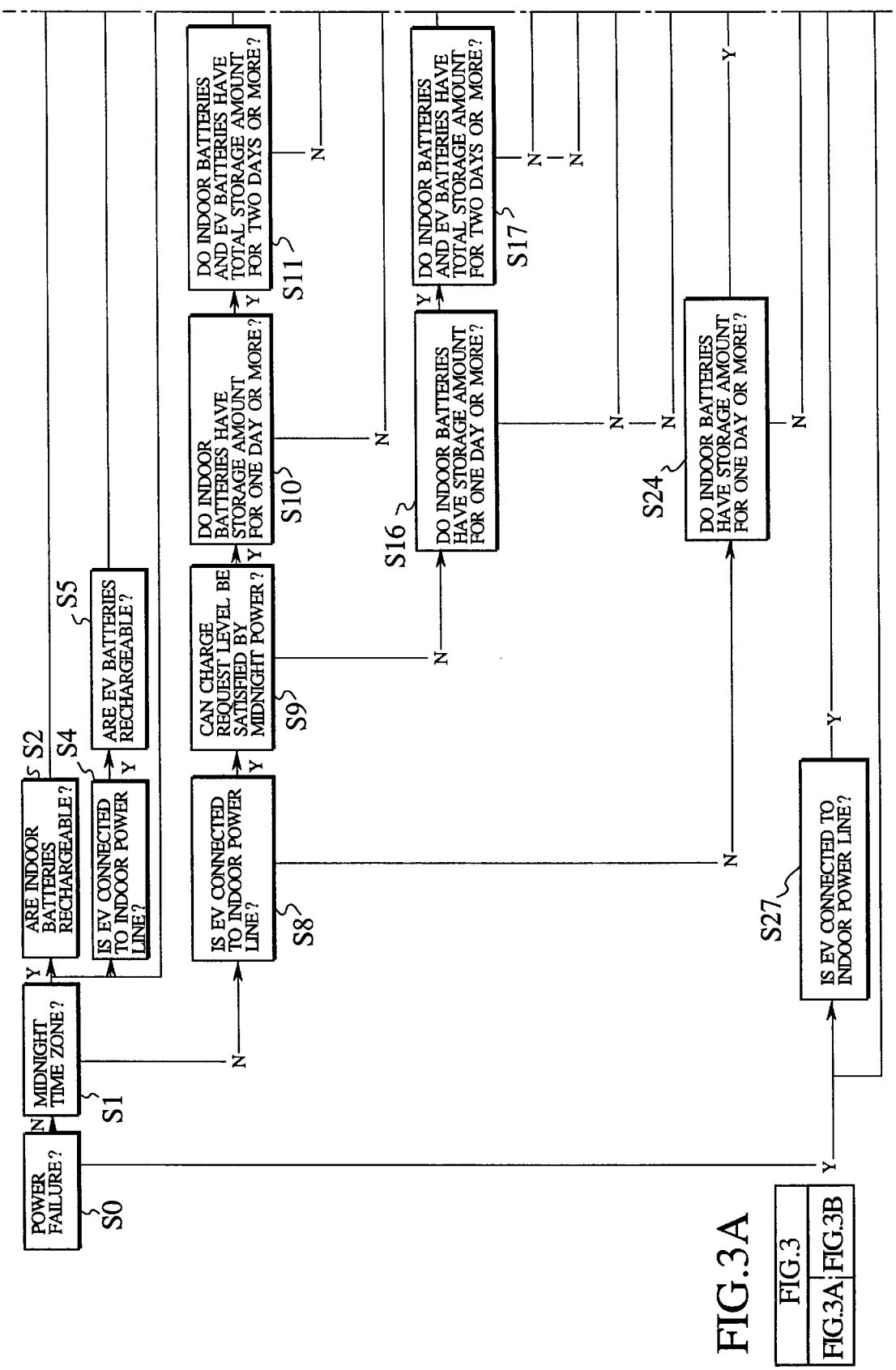
FIGS. 3A&B are a control flowchart of the first embodiment.
Figure 3B:
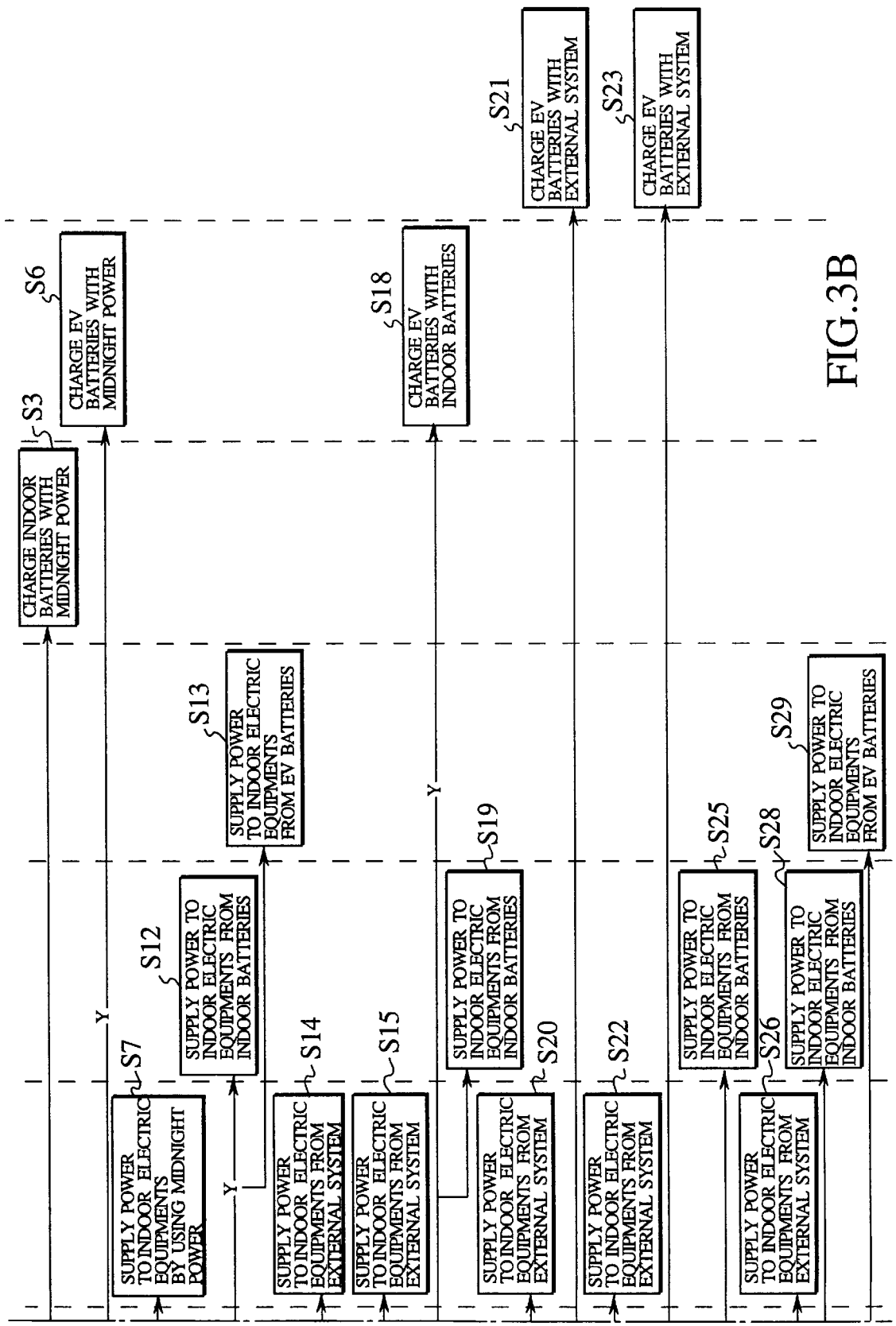

Next, control and operations executed by the controller 17 in the power supply system according to the first embodiment will be explained with reference to a control flowchart shown in FIG. 3.

To begin with, in step S0, it is decided whether or not power is supplied from the electric power company (whether or not a power failure is caused). Then, if "YES" (power is not supplied from the electric company), the process advances to step S27 and step S29. In step S27, it is decided whether or not the inlet portion 22 of the electric vehicle (abbreviated as an "EV" hereinafter) 20 is connected to the charging/discharging connector 19. If "YES" (the EV is connected to the connector 19), the process advances to step S28. In step S28, power is supplied to the indoor electric equipments 13 from the indoor batteries 15. In step S29, power is supplied to the indoor electric equipments 13 from the vehicle batteries 21.

In contrast, if "NO" (power is supplied from the electric company) in step S0, the process goes to step S1. In step S1, it is decided whether or not a time belongs to a midnight time zone. In the midnight time zone, power supplied from the electric power company is treated as midnight power whose cost is set low. If "YES" (the time belongs to the midnight time zone), the process proceeds to steps S2, S4, and S7.

In step S2, it is decided whether or not the indoor batteries 15 are rechargeable. If "YES" (the indoor batteries 15 are rechargeable), the process goes to step S3. In step S3, the indoor batteries 15 are charged with midnight power.

In step S4, it is decided whether or not the inlet portion 22 of the EV is connected to the charging/discharging connector 19. If "YES" (the inlet portion 22 is connected to the connector 19), the process advances to step S5. In step S5, it is decided whether or not the EV batteries 21 are rechargeable. If "YES" (the EV batteries 21 are rechargeable), the process goes to step S6. In step S6, the EV batteries 21 are charged with midnight power.

In step S7, power is supplied to the indoor electric equipments 13 by using midnight power.

On the contrary, if "NO" (the time does not belong to the midnight time zone) in step S1, the process advances to step S8. In step S8, it is decided whether or not the EV 20 is connected to the indoor power line 18 (charging/discharging connector 19). If "YES" (the EV 20 is connected to the indoor power line 18), the process goes to step S9. In step S9, it is decided whether or not a charge request level of the EV 20 can be satisfied by using midnight power. If "YES" (the charge request level of the EV 20 can be satisfied by using midnight power), the process goes to step S10. In step S10, it is decided whether or not a storage amount of the indoor batteries 15 exceeds a predetermined amount (e.g., storage amount for one day or more). If "YES" (the storage amount of the indoor batteries 15 exceeds the predetermined amount), the process goes to step S11. In step S11, it is decided whether or not a total storage amount of the indoor batteries 15 and the vehicle batteries 21 exceeds another predetermined amount (e.g., total storage amount for two days or more). If "YES" (the total storage amount exceeds another predetermined amount), the process goes to steps S12 and S13. In step S12, power is supplied to the indoor electric equipments 13 from the indoor batteries 15. In step S13, power is supplied to the indoor electric equipments 13 from the vehicle batteries 21.

In contrast, if "NO" (the total storage amount does not exceed another predetermined amount) in step S11, the process goes to step S14. In step S14, power is supplied to the indoor electric equipments 13 from the power line (external system) 11. Also, if "NO" (the storage amount of the indoor batteries 15 does not exceed the predetermined amount) in step S10, the process goes to step S15. In step S15, power is supplied to the indoor electric equipments 13 from the power line 11.

In this manner, since power supply to the indoor electric equipments 13 is controlled according to the storage amount of the indoor batteries 15 and the vehicle batteries 21, cheap power can be utilized effectively.

In the meanwhile, if "NO" (the charge request level of the EV 20 cannot be satisfied by using midnight power) in step S9, the process goes to step S16. In step S16, it is decided whether or not a storage amount of the indoor batteries 15 exceeds the predetermined amount (e.g., storage amount for one day or more). If "YES" (the storage amount of the indoor batteries 15 exceeds the predetermined amount), the process goes to step S17. In step S17, it is decided whether or not a total storage amount of the indoor batteries 15 and the vehicle batteries 21 exceeds another predetermined amount (e.g., total storage amount for two days or more). If "YES" (the total storage amount exceeds another predetermined amount), the process goes to steps S18 and S19. In step S18, the vehicle batteries 21 are charged with the indoor batteries 15. In step S19, power is supplied to the indoor electric equipments 13 from the indoor batteries 15.

If "NO" (the total storage amount does not exceed another predetermined amount) in step S17, the process goes to steps S20 and S21. In step S20, power is supplied to the indoor electric equipments 13 from the power line 11 without use of the indoor batteries 15, etc. In step S21, the vehicle batteries 15 are charged with the power line 11.

If "NO" (the storage amount of the indoor batteries 15 does not exceed the predetermined amount) in step S16, the process goes to steps S22 and S23. In this case, since the storage amount of the indoor batteries 15 is reduced (e.g., storage amount for one day or less), power is supplied to the indoor electric equipments 13 from the power line 11 in step S22 and also the vehicle batteries 15 are charged with the power line 11 in step S23.

In addition, if "NO" (the EV 20 is not connected to the charging/discharging connector 19) in step S8, the process goes to step S24. In step S24, it is decided that a storage amount of the indoor batteries 15 is in excess of a predetermined amount (e.g., storage amount for one day or more). If "YES" (the storage amount of the indoor batteries 15 is in excess of the predetermined amount), the process goes to step S25. In step S25, power is supplied to the indoor electric equipments 13 from the indoor batteries 15. In contrast, if "NO" (the storage amount of the indoor batteries 15 is less than the predetermined amount) in step S24, the process goes to step S26. In step S26, power is supplied to the indoor electric equipments 13 from the power line 11.

Like the above, in this embodiment, since both the charger/discharger 16 and the vehicle power system 23 are provided, it is possible to supply AC power on the housing side to the EV 20 side as DC power and conversely supply the DC current from the EV 20 side to the housing side as AC power. In other words, both the vehicle batteries 21 and the indoor batteries 15 can be employed as housing power. As a result, sufficient power storage can be implemented.

Further, low cost power such as midnight power can be supplied to one or both of the vehicle batteries 21 of the EV 20 and the indoor batteries 15 provided in the housing, and accumulated power can be employed for the indoor electric equipments 13. In other words, the indoor batteries 15, the vehicle batteries 21, and power supplied from the electric power company are employed efficiently. As a result, power consumption is considerably reduced, an economical efficiency is improved, and even consumption of power is achieved.

Besides, for example, if a charging condition of the vehicle batteries 21 of the EV 20 and the user's requests (e.g., such a request that the user wish to drive for about 10 km after one hour when he or she gets out of the EV 20) are input into the controller 17, control in which power supply to the EV 20 is executed preferentially according to the user's requests can be accomplished.

Moreover, if the electric fee (day/night) and the cost of power stored in the vehicle batteries 21 and the indoor batteries 15 are compared with each other, consumption and charge of power can be effected so as to minimize the cost of power.

Furthermore, at the time of power failure when power supply from the external system is stopped/cut off temporarily or continuously because of disaster, accident, etc., power being accumulated in at least one of the vehicle batteries 21 and the indoor batteries 15 is supplied to the housing side. Therefore, operations of the indoor electric equipments 13 are maintained and also inconvenience, danger, etc. of the resident are avoided. In this case, preferably a charging level of the indoor batteries 15 should be set against the disaster, etc.

It is of course that signal lines may be connected mutually by connecting the charging/discharging connector 19 and the inlet portion 22 so as to enable transmission/reception of information between the housing and the EV 20.

Figure 4:
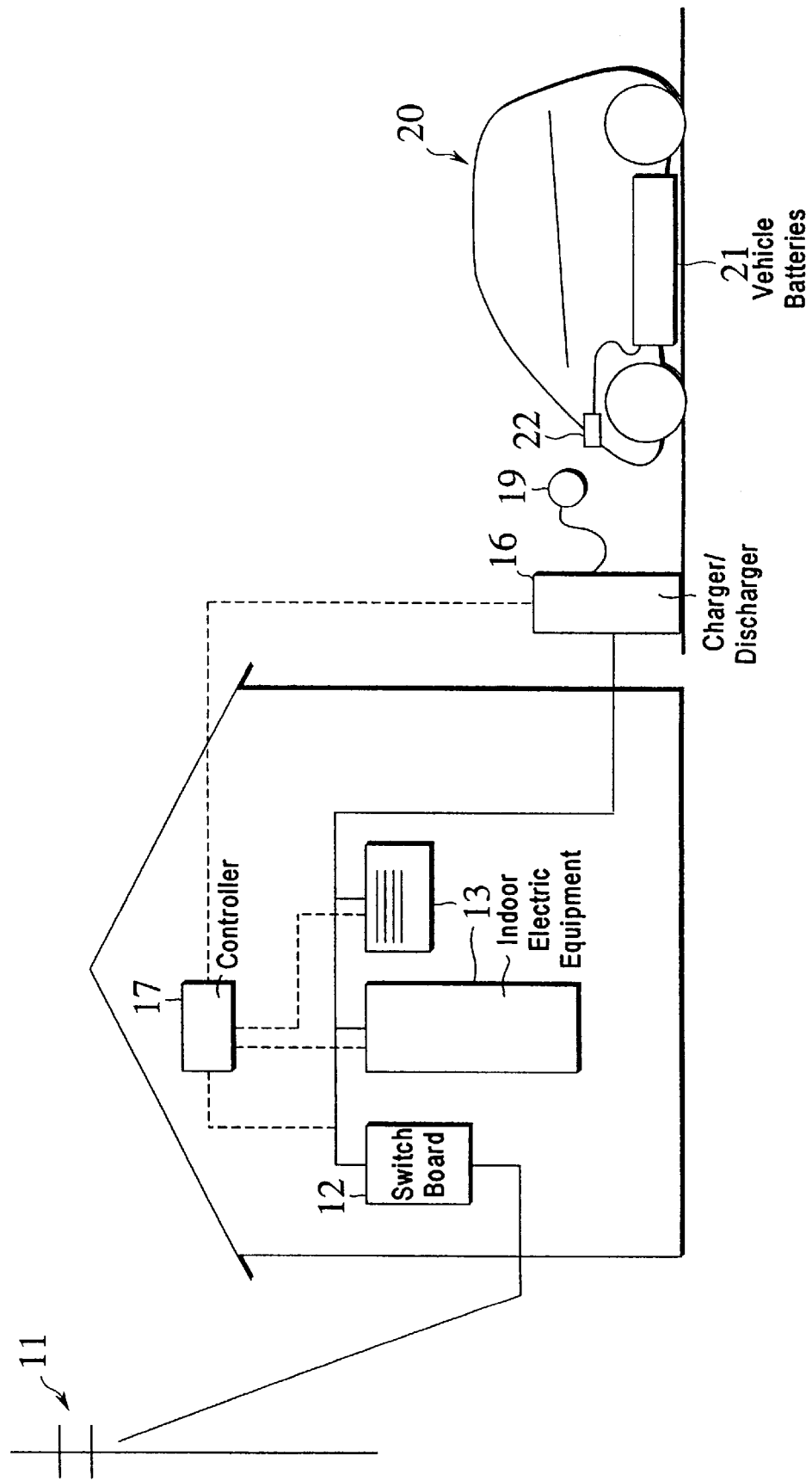
FIG. 4 is a schematic view showing a configuration of a second embodiment.

FIG. 4 is a schematic view showing a configuration of a household power supply system using an electric vehicle according to a second embodiment. In the household power supply system according to the second embodiment, the charging/discharging equipment 14 and the indoor batteries 15 on the housing side in the first embodiment are not provided, but remaining configurations are similar to those in the first embodiment. Also, operations of respective constituent parts are similar to those in the first embodiment and therefore their explanation is omitted.

Figure 5:
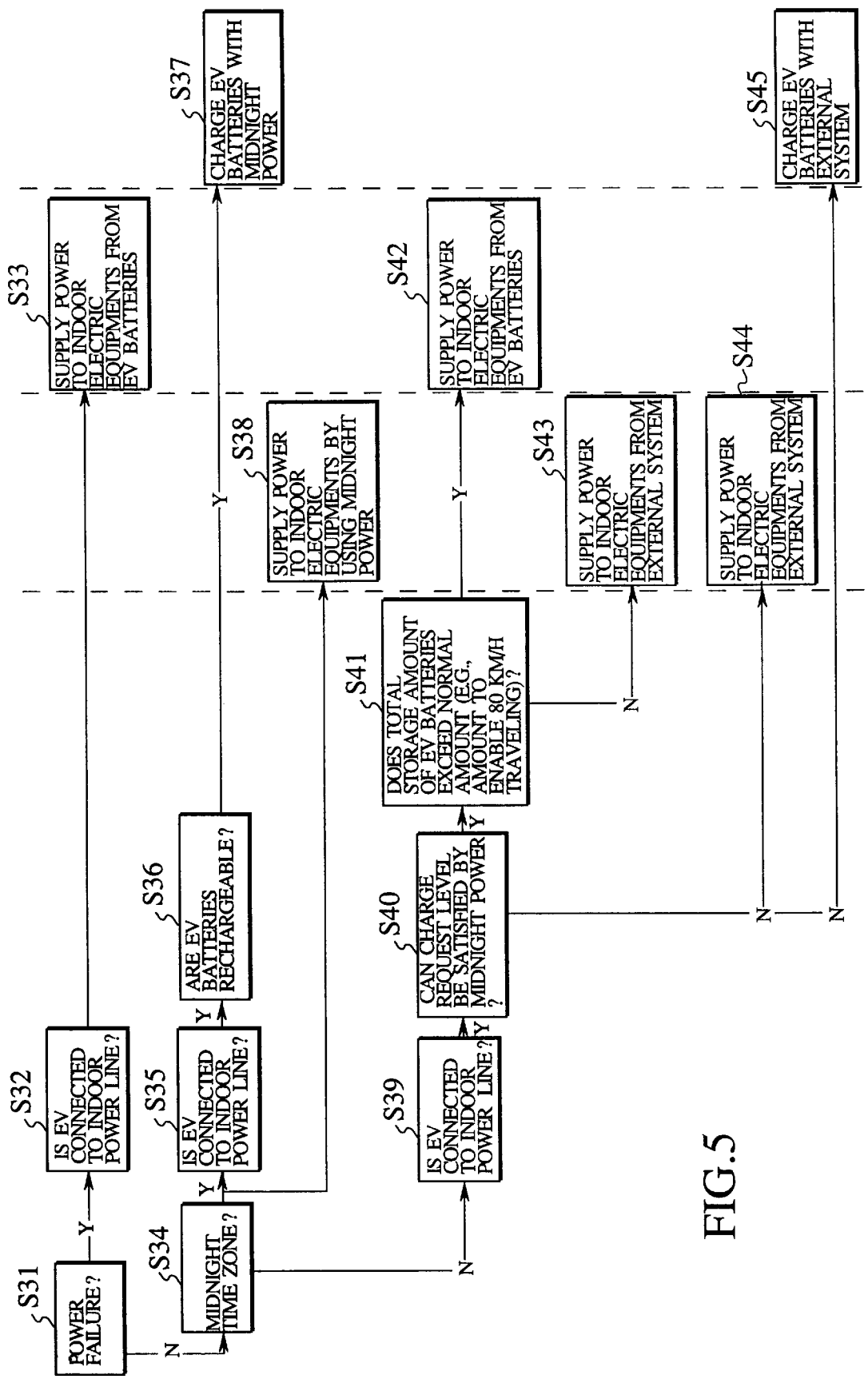
FIG. 5 is a control flowchart of the second embodiment.

Next, control and operations executed by the controller 17 in the power supply system according to the second embodiment will be explained with reference to a control flowchart shown in FIG. 5.

To begin with, in step S31, it is decided whether or not power is supplied from the electric power company (power failure is caused). If "YES" (power is not supplied from the electric company), the process goes to step S32. In step S32, it is decided whether or not the inlet portion 22 of the EV 20 is connected to the charging/discharging connector 19. If "YES" (the inlet portion 22 is connected to the charging/discharging connector 19), the process advances to step S33. In step S33, power is supplied to the indoor electric equipments 13 from the indoor batteries 15.

On the contrary, if "NO" (power is supplied from the electric power company) in step S31, the process goes to step S34. In step S34, it is decided whether or not a time belongs to the midnight time zone. If "YES" (the time belongs to the midnight time zone), the process advances to steps S35 and S38.

In step S35, it is decided whether or not the inlet portion 22 of the EV 20 is connected to the charging/discharging connector 19. If "YES" (the inlet portion 22 is connected to the charging/discharging connector 19), the process goes to step S36. In step S36, it is decided whether or not the vehicle batteries 21 are rechargeable. If "YES" (the vehicle batteries 21 are rechargeable), the process proceeds to step S37. In step S37, the vehicle batteries 21 are charged with midnight power.

In step S38, power is supplied to the indoor electric equipments 13 by using midnight power.

In contrast, if "NO" (the time does not belong to the midnight time zone) in step S34, the process advances to step S39. In step S39, it is decided whether or not the EV 20 is connected to the indoor power line 18 (charging/discharging connector 19). If "YES" (the EV 20 is connected to the indoor power line 18), the process goes to step S40. In step S40, it is decided whether or not the charge request level of the EV 20 can be satisfied by using midnight power. If "YES" (the charge request level of the EV 20 can be satisfied by using midnight power), the process goes to step S41. In step S41, it is decided whether or not a total storage amount of the vehicle batteries 21 exceed a normal amount (e.g., an amount to enable a 80 km/h traveling). If "YES" (the total storage amount of the vehicle batteries 21 exceed the normal amount) in step S41, the process goes to step S42. In this case, since the vehicle batteries 21 have an enough amount, power is supplied to the indoor electric equipments 13 from the vehicle batteries 21 in step S42. In contrast, if "NO" (the total storage amount of the vehicle batteries 21 is less than the normal amount) in step S41, the process goes to step S43. In step S43, power is supplied to the indoor electric equipments 13 from the power line (external system) 11.

In addition, if "NO" (the charge request level of the EV 20 can be satisfied by using midnight power) in step S40, the process goes to steps S44 and S45. In step S44, power is supplied to the indoor electric equipments 13 from the power line (external system) 11. In step S45, the vehicle batteries 15 are charged with the power line (external system) 11.

With the above, the second embodiment of the present invention has been explained. However, in the second embodiment, power supply can be supplied from the vehicle batteries 21 of the EV 20 such that the home electric equipments can be run for predetermined days in the power failure state including the time of disaster, or the vehicle batteries 21 can be charged at a minimum cost against the power failure state. In this case, other operations and advantages of the second embodiment are similar to those in the above first embodiment of the present invention.

What is claimed is:

1. A household electric power supply system using an electric vehicle, comprising:
   an external power system;
   a house having house-wiring, the external power system supplying power to the house-wiring;
   an electric vehicle having a vehicle power system with a vehicle storage battery;
   a charger/discharger separable connecting between the house-wiring and the vehicle power system;
   a controller controlling power supply to the house-wiring; and
   a household battery connected with the house-wiring.

2. The household electric power supply system as claimed in claim 1, wherein
   the controller controls power supply from the vehicle storage battery to the house-wiring via the charger/discharger and power supply from the household battery to the house-wiring.

3. The household electric power supply system as claimed in claim 2, wherein the controller detects power supply from the external power system to the house-wiring, and permits power supply from at least one of the vehicle and house storage batteries to the house-wiring as power supply from the external power system is stopped.

4. The household electric power supply system as claimed in claim 2, wherein the controller controls power supply from the house-wiring to the household battery.

5. The household electric power supply system as claimed in claim 4, wherein
   the controller detects midnight power supply from the external power system to the house-wiring, and
   when midnight power supply is detected, the controller inhibits power supply from the household battery to the house-wiring, and permits power supply from the external power system to the house-wiring and power supply from the house-wiring to the household battery.

6. The household electric power supply system as claimed in claim 4, wherein
   the controller detects a storage amount of the household battery, and controls power supply between the household battery and the house-wiring according to the charge amount.

7. A household electric power supply system using an electric vehicle, comprising:
   an external power system;
   a house having house-wiring, the external power system supplying power to the house-wiring;
   an electric vehicle having a vehicle power system with a vehicle storage battery;
   a charger/discharger separable connecting between the house-wiring and the vehicle power system;
   a controller controlling power supply to the house-wiring, wherein
   the controller selectable sets the charger/discharger and the vehicle power system into first and second states,
   the house-wiring supplies power to the vehicle storage battery in the first state, and
   the vehicle storage battery supplies power to the house-wiring in the second state.

8. A household electric power supply system using an electric vehicle, comprising:
   an external power system;
   a house having house-wiring, the external power system supplying power to the house-wiring;
   an electric vehicle having a vehicle power system with a vehicle storage battery;
   a charger/discharger separable connecting between the house-wiring and the vehicle power system;
   a controller controlling power supply to the house-wiring, wherein
   the charger/discharger includes first and second inverters,
   the first inverter outputs power to the vehicle power system,
   the second inverter receives power from the vehicle power system,
   the vehicle power system includes third and fourth inverters,
   the third inverter converts alternating power from the charger/discharger into direct power, and
   the fourth inverter converts direct power form the vehicle storage battery into alternating power.

9. A household electric power supply system using an electric vehicle, comprising:
   an external power system:
   a house having house-wiring, the external power system supplying power to the house-wiring;
   an electric vehicle having a vehicle power system with a vehicle storage battery;
   means for charging and discharging, the means separable connecting between the house-wiring and the vehicle power system;
   means for controlling power supply to the house-wiring; and
   a household battery connected with the house-wiring.

10. The household electric power supply system as claimed in claim 9, wherein
    the means for controlling power supply to the house-wiring detects power supply from the external power to the house-wiring, and when power supply from the external power system is stopped, the means for controlling power to the house-wiring permits power supply from the vehicle storage battery to the house-wiring.

11. An emergency household electric power supply system using a power supply of an electric vehicle, comprising:
- a house having wiring connecting to an external electric power source and supplying electric energy to a household electrical appliance;
- an electric vehicle having a rechargeable battery which supplies electric energy to a drive unit;
- a charger selectively connectable between said wiring and said rechargeable battery, for supplying electric energy from said wiring to said rechargeable battery;
- a discharger selectively connectable between said rechargeable battery and said wiring, for supplying electric energy from said rechargeable battery to said wiring;
- a controller managing the connection between said wiring and said rechargeable battery to control selection of said discharger to supply electric energy from said rechargeable battery to said household electrical appliance through said wiring in an emergency energy supply condition.

12. The emergency household electric power supply system using a power supply of an electric vehicle, according to claim 11, wherein
the controller includes a detector which detects the emergency energy supply condition using an energy supply condition of the external electric power source.

13. The emergency household electric power supply system using a power supply of an electric vehicle, according to claim 12, wherein
the detector detects the emergency energy supply condition from a stopping of supplying electric energy from the external electric power source.

14. The emergency household electric power supply system using a power supply of an electric vehicle, according to claim 12, wherein
when the emergency energy supply condition is detected, the controller manages connecting the vehicle rechargeable battery to the discharger to supply electric energy from the rechargeable battery to said household electrical appliance through said wiring.

15. The emergency household electric power supply system using a power supply of an electric vehicle, according to claim 12, wherein
the controller includes a second detector which detects a midnight power supply energy supply condition of the external electric power source, and
the controller manages connecting the vehicle rechargeable battery to the charger to supply electric energy from the external electric power source upon detection of the midnight power supply energy supply condition.

16. The emergency household electric power supply system using a power supply of an electric vehicle, according to claim 12, wherein
said controller includes a third detector which detects storage amount of said rechargeable battery, and
the controller manages connecting the vehicle rechargeable battery to the charger to supply electric energy from the external electric power source to said rechargeable battery when the detected storage amount indicates the rechargeable battery needs recharging.

17. A method for supplying electric power to a household electrical appliance using a rechargeable battery of an electric vehicle in an emergency condition comprising:
- a step of detecting with a detector an emergency energy supply condition using an energy supply condition of an external electric power source;
- a step of selecting a discharger to connect between the rechargeable battery and a wiring in a house for supplying electric energy from the rechargeable battery to the wiring when the emergency energy supply condition is detected;
- a step of supplying electric energy from the rechargeable battery to the household electric appliance connected to the wiring in the emergency energy supply condition;
- a step of detecting with another detector a non-emergency energy supply condition of the external electric power source;
- a step of selecting a charger to connect between the rechargeable battery and the wiring in the house for supplying electric energy from the power source to the rechargeable battery when the non-emergency energy supply condition is detected; and
- a step of supplying electric energy from the power source to the rechargeable battery to recharge the rechargeable battery during the non-emergency energy supply condition.

* * * * *